US008340062B2

(12) United States Patent
Tan et al.

(10) Patent No.: US 8,340,062 B2
(45) Date of Patent: Dec. 25, 2012

(54) UNCONTROLLED SPATIAL MULTIPLE ACCESS IN WIRELESS NETWORKS

(75) Inventors: Kun Tan, Beijing (CN); Jiansong Zhang, Beijing (CN); Yongguang Zhang, Beijing (CN); He Liu, La Jolla, CA (US); Ji Fang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 274 days.

(21) Appl. No.: 12/792,677

(22) Filed: Jun. 2, 2010

(65) Prior Publication Data

US 2011/0299612 A1 Dec. 8, 2011

(51) Int. Cl.
*H04L 27/28* (2006.01)

(52) U.S. Cl. ........................................ 370/338; 375/260

(58) Field of Classification Search .................. 370/328, 370/334, 338, 344, 203; 375/229, 260
See application file for complete search history.

(56) References Cited

U.S. PATENT DOCUMENTS

| | | | |
|---|---|---|---|
| 7,257,764 B2 | 8/2007 | Suzuki | |
| 7,606,204 B2 | 10/2009 | Sebastian | |
| 2009/0010149 A1 | 1/2009 | Lee | |
| 2010/0142479 A1* | 6/2010 | Black et al. | 370/331 |
| 2010/0157785 A1* | 6/2010 | Song et al. | 370/203 |
| 2010/0177657 A1* | 7/2010 | Kim et al. | 370/252 |
| 2010/0177845 A1* | 7/2010 | Murakami et al. | 375/295 |
| 2010/0182987 A1* | 7/2010 | Shin et al. | 370/338 |
| 2011/0149927 A1* | 6/2011 | Stacey et al. | 370/338 |
| 2011/0268094 A1* | 11/2011 | Gong et al. | 370/338 |

OTHER PUBLICATIONS

Foschini, G. J., Layered space-time architecture for wireless communication in a fading environment when using multi-element antennas, Bell Labs Technical J., Autumn 1996, pp. 41-59, vol. 1, No. 2.
Gesbert, D., M. Kountouris, R. W. Heath Jr., C. B. Chae, and T. Sälzer, From single user to multiuser communications: Shifting the MIMO paradigm, IEEE Signal Proc. Magazine, Oct. 2007, vol. 24, No. 5, pp. 36-36.
Gollakota, S., S. D. Perli, D. Katabi, Interference alignment and cancellation, Proc. of the ACM SIGCOMM 2009 Conf. on Applications, Technologies, Architectures, and Protocols for Comp. Comm., SIGCOMM 2009, Aug. 17-21, 2009, pp. 159-170, Barcelona, Spain.

(Continued)

*Primary Examiner* — Brian D Nguyen
(74) *Attorney, Agent, or Firm* — Lyon & Harr, L.L.P.; Craig S. Fischer

(57) ABSTRACT

An uncontrolled spatial multiple access system and method facilitating spatial multiple access for multiple devices in a wireless local-area network (WLAN). Embodiments of the system and method increase throughput of the wireless network by facilitating concurrent encoded frame transmission. Decoding of the quasi-overlapped frames is achieved using a chain decoding technique that takes data streams (or signals) containing the quasi-overlapping encoded frames and isolates each encoded frame so that the frame can be decoded. Quasi-overlapped frames means that the frames are overlapped in the body of the frame but not at the preamble (or headers) of the frames. Embodiments of the chain decoding also use interference nullifying and interference cancellation to enable concurrent quasi-overlapping transmission. A carrier counting multiple access technique of embodiments of the system and method allow wireless networks to retain their asynchronous nature while supporting spatial multiple access and maintain backwards compatibility with the IEEE 802.11 standard.

20 Claims, 9 Drawing Sheets

OTHER PUBLICATIONS

Gollakota, S., D. Katabi, Zigzag decoding: Combating hidden terminals in wireless networks, Proc. of the ACM SIGCOMM 2008 Conf. on Applications, Technologies, Architectures, and Protocols for Comp. Comm., SIGCOMM 2008, Aug. 17-22, 2008, pp. 159-170, Seattle, WA, USA.

Halperin, D., T. E. Anderson, D. Wetherall, Taking the sting out of carrier sense: Interference cancellation for wireless LANs, Proc. of the 14th Annual Int'l Conf. on Mobile Computing and Networking, MOBICOM 2008, Sep. 8-12, 2008, pp. 339-350, San Francisco, California, USA.

Jiang, M., L. Hanzo, Multiuser MIMO-OFDM for next-generation wireless systems, Proc. of the IEEE, Jul. 2007, pp. 1430-1469, vol. 95, No. 7.

Kim, T.-S., H. L. Gwangju, J. C. Hou, Improving spatial reuse through tuning transmit power, carrier sense threshold, and data rate in multihop wireless networks, Proc. Of the 12th Annual Int'l Conf. on Mobile Computing and Networking, Sep. 23-26, 2006, pp. 366-377, Los Angeles, California, USA.

Miu, A., G. Tan, H. Balakrishnan, J. Apostolopoulos, Divert: Fine-grained path selection for wireless LANs, Proc. of the 2nd Int'l Conf. on Mobile Systems, Applications, and Services, Jun. 6-9, 2004, pp. 203-216, Boston, Massachusetts, USA.

Miu, A., H. Balakrishnan, C. E. Koksal, Improving loss resilience with multi-radio diversity in wireless networks, Proc. of the 11th Annual Int'l Conf. on Mobile Computing and Networking, Aug. 28-Sep. 2, 2005, pp. 16-30, Cologne, Germany.

Tan, K., J. Zhang, J. Fang, H. Liu, Y. Ye, S. Wang, Y. Zhang, H. Wu, W. Wang, G. M. Voelker, Sora: High-performance software radio using general-purpose multi-core processors, Proc. of the 6th USENIX Symposium on Networked Systems Design and Implementation, NSDI 2009, Apr. 22-24, 2009, pp. 75-90, Boston, MA, USA.

Vutukuru, M., K. Jamieson, H. Balakrishnan, Harnessing exposed terminals in wireless networks, Proc. of the 5th USENIX Symposium on Networked Systems Design & Implementation, NSDI 2008, Apr. 16-18, 2008, pp. 59-72, San Francisco, CA.

Wolniansky, P. W., V-Blast: An architecture for realizing very high data rates over the rich-scattering wireless channel, 1998 URSI International Symposium on Signals, Systems, and Electronics, ISSSE 1998, Sep. 29-Oct. 2, 1998, pp. 295-300.

Woo, G. R., P. Kheradpour, D. Shen, D. Katabi, Beyond the bits: Cooperative packet recovery using physical layer information, Proc. of the 13th Annual Int'l Conf. on Mobile Computing and Networking, MOBICOM 2007, Sep. 9-14, 2007, pp. 147-158, Montréal, Québec, Canada.

\* cited by examiner

UNCONTROLLED SPATIAL MULTIPLE ACCESS IN WIRELESS NETWORKS

BACKGROUND

A wireless local-area network (WLAN) links wireless-enabled devices using a distribution method (such as orthogonal frequency-division multiplexing (OFDM). A WLAN allows users to move around an area serviced by the WLAN while still maintaining interconnectivity. This is one reason why WLANs have become increasingly popular with consumers both in the home and in commercial and public areas.

Multiple-input and multiple-output (MIMO) technology MIMO is an emerging technology that can significantly boost network capacity by exploiting the spatial properties of wireless channels on the WLAN. It has been included in several wireless standards, most notably the latest ratified Institute of Electrical and Electronics Engineers (IEEE) IEEE 802.11n standard. Many commercial wireless devices are already using this standard. If a device using this standard has two antennas when communicating with an access point having multiple antennas the device can transmit separate frames on each antenna simultaneously. This can potentially improve its link capacity by a factor of two.

Information theory indicates that it is possible for multiple stations to form a "virtual MIMO" system in which the stations transmit simultaneously. This is called spatial multiple access. In this type of network the access point may still be able to decode all frames correctly as long as the number of concurrent frames is less than the number of antennas at the access point. With spatial multi-access all stations can transmit simultaneously to make full use of the access point's antennas. Thus, the network capacity can increase linearly with the number of antennas at the access point. The access point is precisely the device in the network that can best accommodate the cost, size, and power of a relatively large number of radios.

Conventional single user MIMO systems support only point-to-point communication, where the sampling clocks for all antennas at the transmitter (or receiver) are completely synchronized. With single-user MIMO, the capacity improvement is bounded by the number of transmitter or receiver antennas (whichever is smaller). In practice, due to size, cost, and power limitations, mobile stations generally have only a few antennas. For example, most IEEE 802.11n devices have only two antennas. However, access points do not have the same constraints as mobile stations and can be generously provisioned with resources. This means that an access point can potentially have a much larger number of MIMO radios. Nevertheless, the network capacity will not improve beyond the link capacity as it is constrained by the number of antennas at the mobile station. Therefore, in practice, the number of antennas at the mobile station usually constrains the network capacity.

In contrast, multi-user MIMO (MU-MIMO) systems allow multiple stations to transmit concurrently thereby fully utilizing the antennas of the access point. However, most MU-MIMO systems are based on cellular networks, where the central base station strictly controls and tightly synchronizes all mobile stations. This way the central base station can precisely measure the spatial signatures, including the wireless channels and the delay of the radio signal from sending antenna to each receiving antenna. With such information data streams from different users can be separated using a linear decorrelator or other algorithms.

Thus, spatial multiple access holds the promise to boost the capacity of WLANs when an access point on the WLAN contains multiple antennas. Due to the asynchronous and uncontrolled nature of WLANs, however, conventional multiple-input and multiple-output (MIMO) technology does not work efficiently when concurrent transmissions from multiple stations on the WLAN are uncoordinated or uncontrolled.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the uncontrolled spatial multiple access system and method facilitating spatial multiple access for multiple devices in a random access network (such as a wireless local-area network (WLAN)) in order to increase throughput. Embodiments of the system and method use a chain-decoding technique to reliably recover the channel parameters for each device, and iteratively decode concurrent frames with misaligned symbol timings and frequency offsets. In addition, embodiments of the system and method include new media access control (MAC) layer protocol, called carrier counting multiple access (CCMA), which facilitates concurrent transmissions by different mobile stations while remaining backward compatible with the IEEE 802.11 standard. Embodiments of the system and method facilitate spatial multi-access and improve network capacity by allowing concurrent transmissions.

Embodiments of the chain decoding technique take data streams (or signals) containing quasi-overlapping encoded frames and isolate each encoded frame so that the frame can be decoded. Quasi-overlapped frames means that the frames are overlapped in the body of the frame but not at the preamble (or headers) of the frames. In other words, immediately after the preamble of an encoded first frame is transmitted then an encoded second frame is attached to the signal. Embodiments of the chain decoding technique do not require any strict synchronization between transmitting stations in the wireless network. Moreover, it works on various modulation schemes and with multiple-carrier systems.

The quasi-overlapped signals or data streams concurrently transmitted over the wireless network are separated using the chain decoding technique. The chain decoding technique is a cross-layer approach within the physical layer (PHY) and media access control layer (MAC) of the OSI model. Embodiments of the chain decoding technique target the distributed, uncontrolled environment to allow spatial multiple access in an uncontrolled WLAN. Embodiments of the chain decoding also use interference nullifying and interference cancellation to enable concurrent quasi-overlapping transmission. Unlike current techniques, however, embodiments of the chain decoding technique have no constraints on transmission rate or power. In fact, high-rate frames with similar power can still be reliably decoded by embodiments of the chain decoding technique as they can be separated along the spatial dimension.

The carrier counting multiple access (CCMA) technique of embodiments of the system and method allow WLANs to retain their asynchronous nature while supporting spatial multiple access. In addition, CCMA supports mixed networks with CSMA stations for backwards compatibility.

Embodiments of the system and method allow spatial multiple access for uplink traffic in uncontrolled WLANs, and thereby indirectly increase the throughput of downlink traffic.

There is no need for stations in the WLAN to tightly synchronize their carrier frequency or timing to the access point, nor does a device need to exchange channel state information. With embodiments of the system and method, stations can coordinate their transmissions in a fully distributed fashion, thereby utilizing the spatial wireless channel without relying on access point coordination. Such distributed coordination is a good match to the requirements of typical WLANs, as well as ad-hoc networks where multiple mobile stations may communicate in a peer-to-peer mode.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

Figure 1:
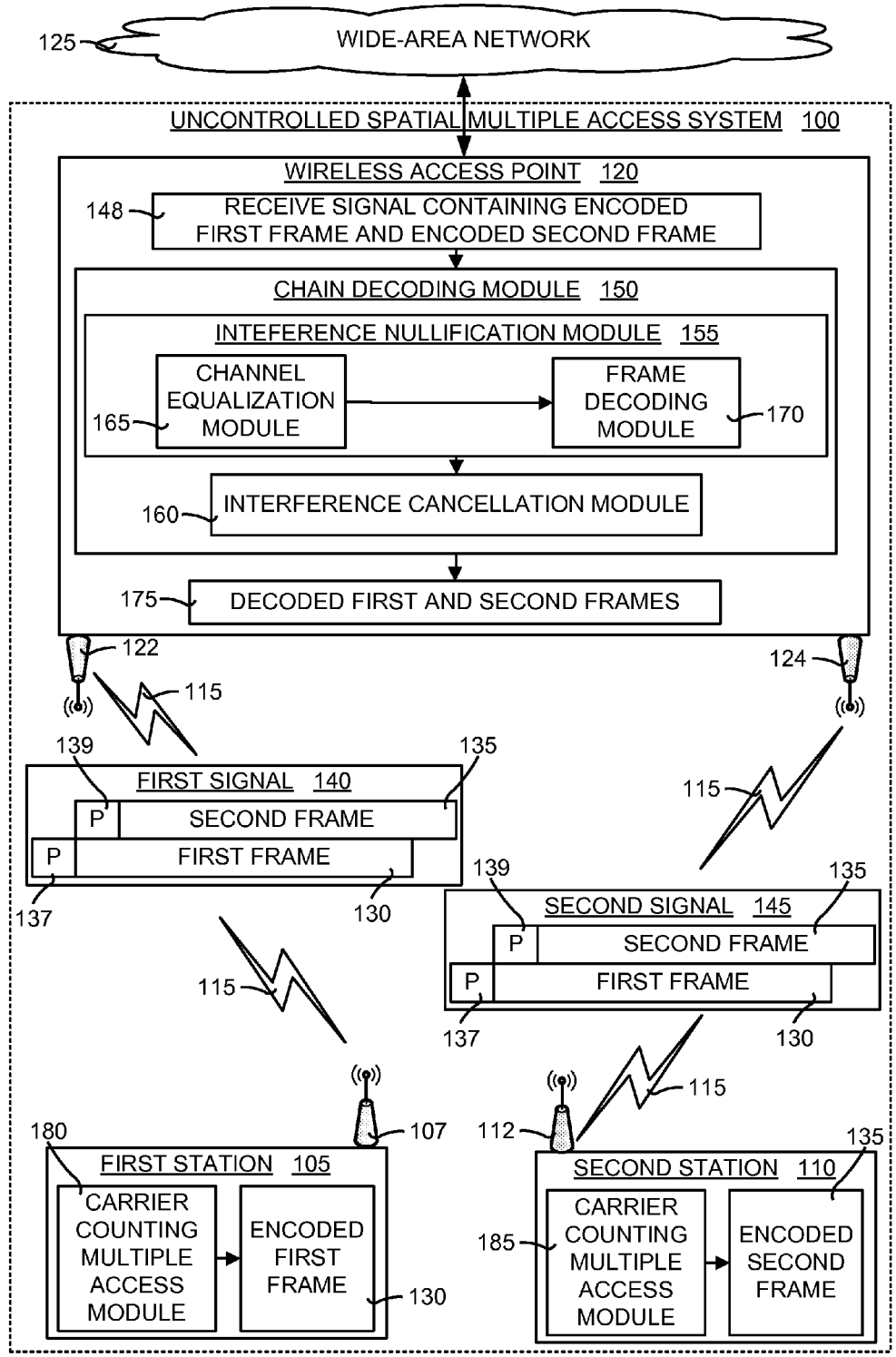
FIG. 1 is a block diagram illustrating a general overview of embodiments of the uncontrolled spatial multiple access system and method implemented in a wireless computer network.

In the following description of embodiments of the uncontrolled spatial multiple access system and method reference is made to the accompanying drawings, which form a part thereof, and in which is shown by way of illustration a specific example whereby embodiments of the uncontrolled spatial multiple access system and method may be practiced. It is to be understood that other embodiments may be utilized and structural changes may be made without departing from the scope of the claimed subject matter.

I. Spatial Multiple Access Overview

The number of concurrent transmissions in a multiple input and multiple output (MIMO) system is limited to the number of antennas at the sender or the receiver (whichever is smaller). If an access point in a wireless local-area network (WLAN) has more antennas, it makes sense to allow more stations to access the wireless channel concurrently to make full use of the number of receiving antennas at the access point.

For example, assume an access point has six antennas and that each of the four stations in the WLAN has only one or two antennas. In this case, the four stations can form a "virtual MIMO" system and transmit six frames simultaneously to the access point. In theory this achieves six times the capacity.

In order to implement this "virtual MIMO" system in a WLAN, however, several difficult technical challenges have to be overcome. First, the transmitting antennas are now distributed across several independent sending stations, and there is no guarantee of an interference-free transmission of their preambles. This preamble interference will significantly affect the accuracy of channel estimations and may result in the loss of all concurrent frames. One naive solution is to apply excessively long preambles to each frame to average out the impact of interference, but doing so will impose significant overhead in the communication system. A more practical approach is to develop a distributed preamble scheme to enable interference-free decoding despite interference from other concurrent transmissions while minimizing the overhead of the preambles on the concurrent channel.

A second challenge is the fact that transmitting antennas are not driven from the same oscillators and this introduces further challenges in decoding concurrent frames. In a simple MIMO system all transmitting antennas have the same symbol timing and frequency offset. In a "virtual MIMO" system, however, when signals from multiple sending stations superimpose together at one of the access point's access point's receiving antenna, neither their symbol timings nor their frequency offsets will align together. In particular, there may no longer exist "ideal sampling points". At the times when the intersymbol interferences from one signal are minimized then the intersymbol interferences from another signal become high. That is, no matter how much over-sampling the receiver can perform, the samples are distorted by interference. This misalignment essentially means that a conventional single user MIMO decoder will not work. Prior work on this problem focuses on tight synchronization among all sending stations, but such an approach requires very complicated electronics that may not suit environments like loosely controlled WLANs.

Both of the above problems have to be solved to enable spatial multi-access in WLANs. One challenge derives from the distributed nature of concurrent transmissions from unsynchronized stations. This challenge calls for a cross-layer PHY/MAC solution to exploit spatial multiplexing in a distributed and unsynchronized method. Embodiments of the uncontrolled spatial multiple access system and method include this cross-layer PHY/MAC solution to exploit spatial multiplexing in an uncontrolled manner.

II. System Overview

FIG. 1 is a block diagram illustrating a general overview of embodiments of the uncontrolled spatial multiple access system 100 and method implemented in a wireless computer network. The uncontrolled spatial multiple access system 100 is shown in FIG. 1 by the dashed line. The wireless computer network typically is a wireless local-area network (WLAN) and includes multiple at least clients or stations. In FIG. 1 is shown a first station 105 having a first antenna 107 and a second station 110 having a second antenna 112. It should be noted that although only two stations 105, 110 are shown in FIG. 1 for the sake of simplicity, typically there are several stations or processing devices that belong to the WLAN. In addition, although each of the two stations 105, 110 is shown having only a single antenna 107, 112, it is possible for each of the stations 105, 110 to contain more than one antenna.

The first station 105 and the second station 110 are in wireless communication 115 with a wireless access point (AP) 120. In turn, the AP 120 typically is in communication with a wide-area network 125 (such as the Internet). As shown in FIG. 1, the AP 120 contains a third antenna 122 and a fourth antenna 124. Although for the sake of simplicity only two antennas 122, 124 are shown in FIG. 1., it should be understood that the AP 120 may contain more than two antennas.

The first station 105 sends a first frame 130 that contains a first preamble 137 (denoted as in FIG. 1 as "P"). Similarly, the second station 110 sends a second frame 135 that contains a second preamble 139 (also denoted in FIG. 1 as "P"). As explained in detail below, the first frame 130 and the second frame 135 are quasi-overlapped such that the second frame 135 attaches to a first signal 140 after the first preamble 137. In other words, after the first preamble 137 of the first frame 130 from the first station 105, then the second frame 135 is overlapped to the first frame 130.

The AP 120 receives the first signal 140 from the third antenna 122 and a second signal 145 from the fourth antenna 124 containing the encoded first frame 130 and the encoded second frame 135 (box 148). The AP 120 includes a chain decoding module 150 to decode the encoded first frame 130 and the encoded second frame 135. The chain decoding module 150 includes an interference nullification module 155 and an interference cancellation module 160. Moreover, the interference nullification module 155 contains a channel equalization module 165 and a frame decoding module 170. Each of these modules is discussed in detail below. The output of the chain decoding module 150 is a decoded first frame and a decoded second frame 175.

In order to facilitate the chain decoding of the encoded frames, the first station 105 and the second station 110 include a carrier counting multiple access module that implements a carrier counting multiple access protocol. A first copy of the carrier counting multiple access module 180 is contained on the first station 105, and a second copy of the carrier counting multiple access module 185 is contained on the second station 110. The carrier counting multiple access modules 180, 185 are given different references numbers to indicate that they are at the very least different copies of the same module. These carrier counting multiple access modules facilitate the generation of the quasi-overlapped frames 130, 135.

III. Operational Overview

Figure 2:
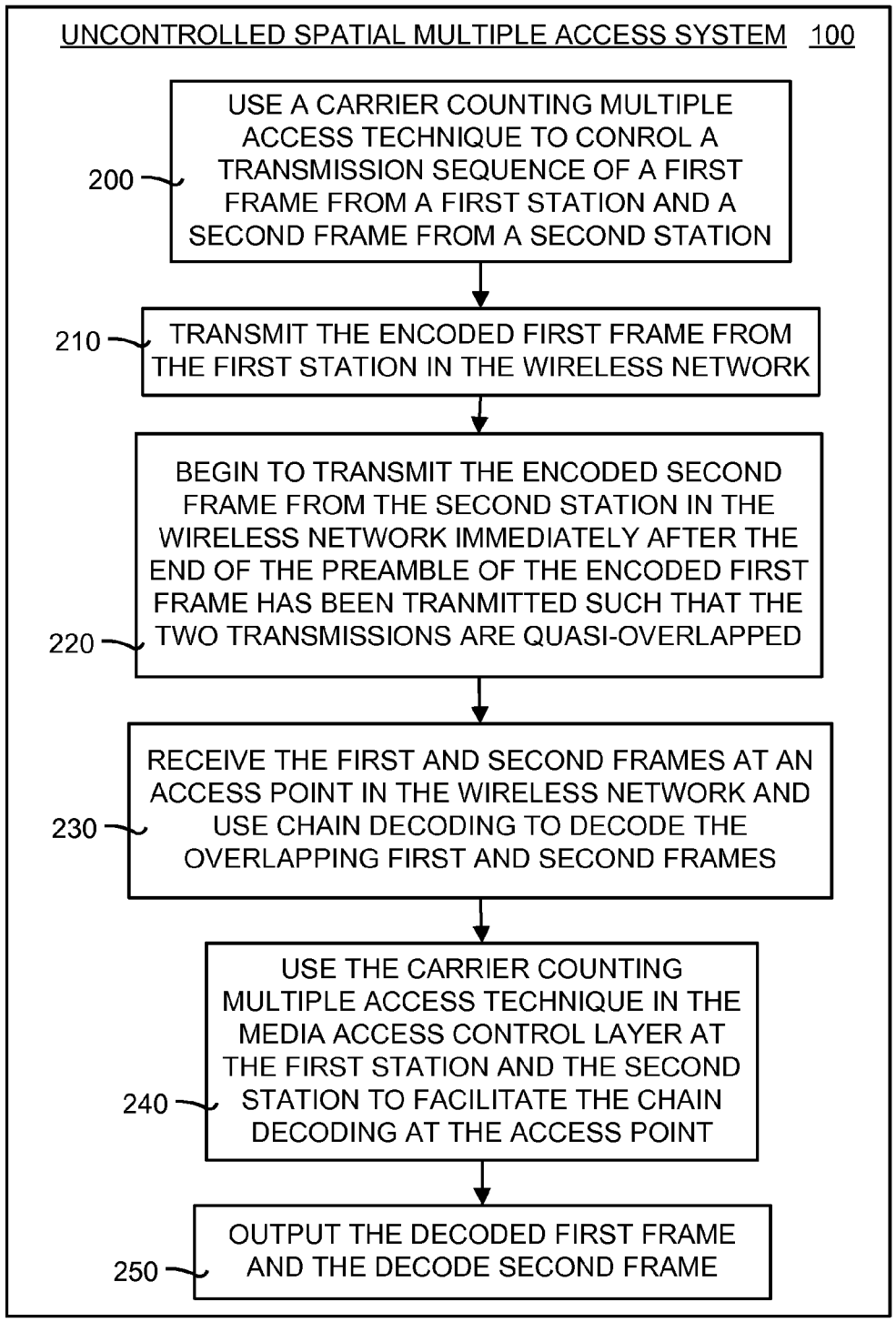
FIG. 2 is a flow diagram illustrating the general operation of embodiments of the uncontrolled spatial multiple access system shown in FIG. 1.

FIG. 2 is a flow diagram illustrating the general operation of embodiments of the uncontrolled spatial multiple access system 100 shown in FIG. 1. The operation of embodiments of the system 100 and method begins by using the carrier counting multiple access technique to controls a transmission sequence of a first frame from a first station and a second frame from a second station (box 200). This involves first transmitting a first encoded frame from the first station in the wireless network (box 210). Next, embodiments of the system 100 and method begin to transmit an encoded second frame from the second station in the wireless network immediately after the end of the preamble of the encoded first frame has been transmitted (box 220). In this manner, the encoded first frame and the encoded second frame are quasi-overlapped.

Next, embodiments of the system 100 and method receive the encoded first frame and the encoded second frame at an access point in the wireless network and chain decoding is used to decode the overlapping encoded first frame and the encoded second frame (box 230). A carrier counting multiple access technique is contained in the media access control layer of the first station and the second station. The carrier counting multiple access technique facilitates the chain decoding of the encoded first frame and the encoded second frame at the access point (box 240). Embodiments of the system 100 and method then output the decoded first frame and the decoded second frame (box 250).

IV. System and Operational Details

Embodiments of the uncontrolled spatial multiple access system 100 and method are a cross-layer design that address the challenges of enabling spatial multiple access for multiple devices in a random access network like a wireless local-area network (WLAN). Embodiments of the system 100 and method use a chain-decoding technique to reliably recover the channel parameters for each device, and iteratively decode concurrent frames with misaligned symbol timings and frequency offsets. In addition, embodiments of the system and method include a carrier counting multiple access technique that facilitates concurrent transmissions by different mobile stations while remaining backward compatible with the IEEE 802.11 standard.

Embodiments of the system 100 and method include a number of modules. In particular, the chain decoding technique uses the chain decoding module 150, the interference nullification module 155, the interference cancellation module 160, the channel equalization module 165, and the frame decoding module 170. The carrier counting multiple access technique is used by the carrier counting multiple access module 180, 185. The operation of each of these modules will now be discussed in detail.

IV.A. Chain Decoding Module

As shown in FIG. 1, embodiments of the uncontrolled spatial multiple access system 100 and method include the chain decoding module 150. Embodiments of the chain decoding module 150 facilitate spatial multiple access in WLANs by allowing multiple concurrent transmission to be quasi-overlapped. In particular, a later frame will start transmission after the end of the preamble of a former frame. In addition, embodiments of the chain decoding module use a decoding structure (called chain-decoding) that can reliably decode the frames in an overlapping transmission.

In this section the steps involved in chain-decoding overlapped transmissions are described. For the sake of simplicity the following discussion focuses on the situation where only the access point has multiple antennas and all mobile stations have a single antenna. It is straightforward to extend the scenario to the situation where mobile nodes in the network also have multiple antennas.

Consider a basic example where two stations transmit concurrently. Without loss of generality, assume that an access point selects two received signals from antenna 1 ($y_1$) and antenna 2 ($y_2$) for decoding. Note that the access point may have more than two antennas, and it can further improve reliability by using the redundant antennas for diversity selection or maximal radio combining (MRC). The discussion below generalizes chain-decoding to the case where more stations spatially access the channel.

Figure 3:
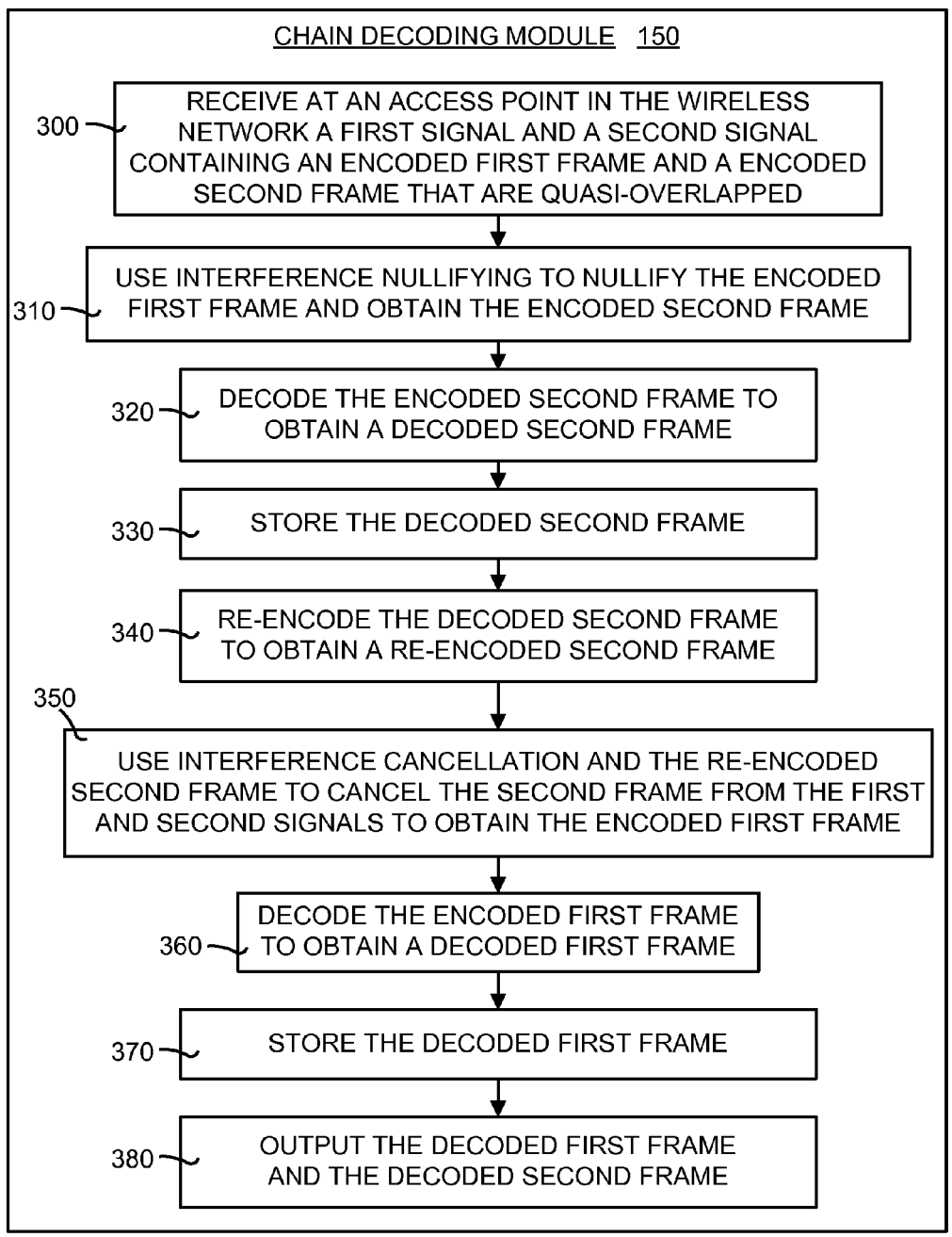
FIG. 3 is a flow diagram illustrating the operational details of embodiments of the chain decoding module shown in FIG. 1.

FIG. 3 is a flow diagram illustrating the operational details of embodiments of the chain decoding module 150 shown in FIG. 1. The operation of embodiments of the module 150 begins by receiving at the access point 120 in the wireless network the first signal 125 and the second signal 140 (box 300). As noted above, the first signal 125 and the second signal 140 both contain the quasi-overlapped encoded first frame 130 and encoded second frame 135.

Next, embodiments of the module 150 use interference nullifying to nullify the encoded first frame 130 and obtain the encoded second frame 135 (box 310). In other words, after interference nullification all that is left is the encoded second frame 135. The access point 120 nullifies the first encoded frame ($P_a$) 130 from both received signals, the first signal ($y_1$) 125 and the second signal ($y_2$) 140. Then embodiments of the module 150 obtain a version of the signal containing only the encoded second frame ($P_b$) 135, which is ready for decoding. The encoded second frame 135 then is decoded to obtain a decoded second frame (box 320). This decoded second frame is stored for later use (box 330).

Second, embodiments of the module 150 perform interference cancellation. After the encoded second frame ($P_b$) 135 has been successfully decoded, it is re-encoded to obtain a re-encoded second frame (box 340). Embodiments of the module 150 then use interference cancellation and the re-encoded second frame to cancel the encoded second frame 135 from the first signal ($y_1$) 125 and the second signal ($y_2$) 140 to obtain at the encoded first frame 130 (box 350). This interference cancellation will result in signals containing only the encoded first frame ($P_a$) 130. The encoded first frame 130 then is decoded to obtain a decoded first frame (box 360). The decoded first frame then is stored along with the decoded second frame for later use (box 370). Embodiments of the module 150 then output the decoded first frame and the decoded second frame (box 380).

IV.A.1. Interference Nullification Module

From the point of view of the access point the first and second signals ($y_i$) 125, 140 are superpositions of the encoded first frame ($P_a$) 130 and the encoded second frame ($P_b$) 135 that are transmitted over different wireless channels. The channel-distorted version of the encoded first frame is denoted as $x_1$ while the channel-distorted version of the encoded second frame is denoted as $x_2$. The general idea of interference nullifying is to find two proper linear transforms for $y_1$ and $y_2$ such that after transformation the channel-distorted version of the encoded first frame ($x_1$) is aligned with exactly the same direction and scale as the channel-distorted version of the encoded second frame ($x_2$). A subtraction of these two transformed signals then will completely remove the channel-distorted version of the encoded first frame ($x_1$). The result is another third signal $y_3$ that contains only the information of the channel-distorted version of the encoded second frame ($x_2$) and is ready for decoding.

Although there can be multiple ways to align the signals, the most natural way is to recover the signals to the original $x_1$ that is transmitted, which is an operation that typically is done in any communication system. There is a clean preamble of $P_a$ such that the system parameters of $P_a$ can be estimated. This includes symbol timing and carrier frequency offset using standard mechanisms for single-user communication. However, particular attention can be paid to the design of the equalizer that removes the distortion due to multi-path fading.

Figure 4:
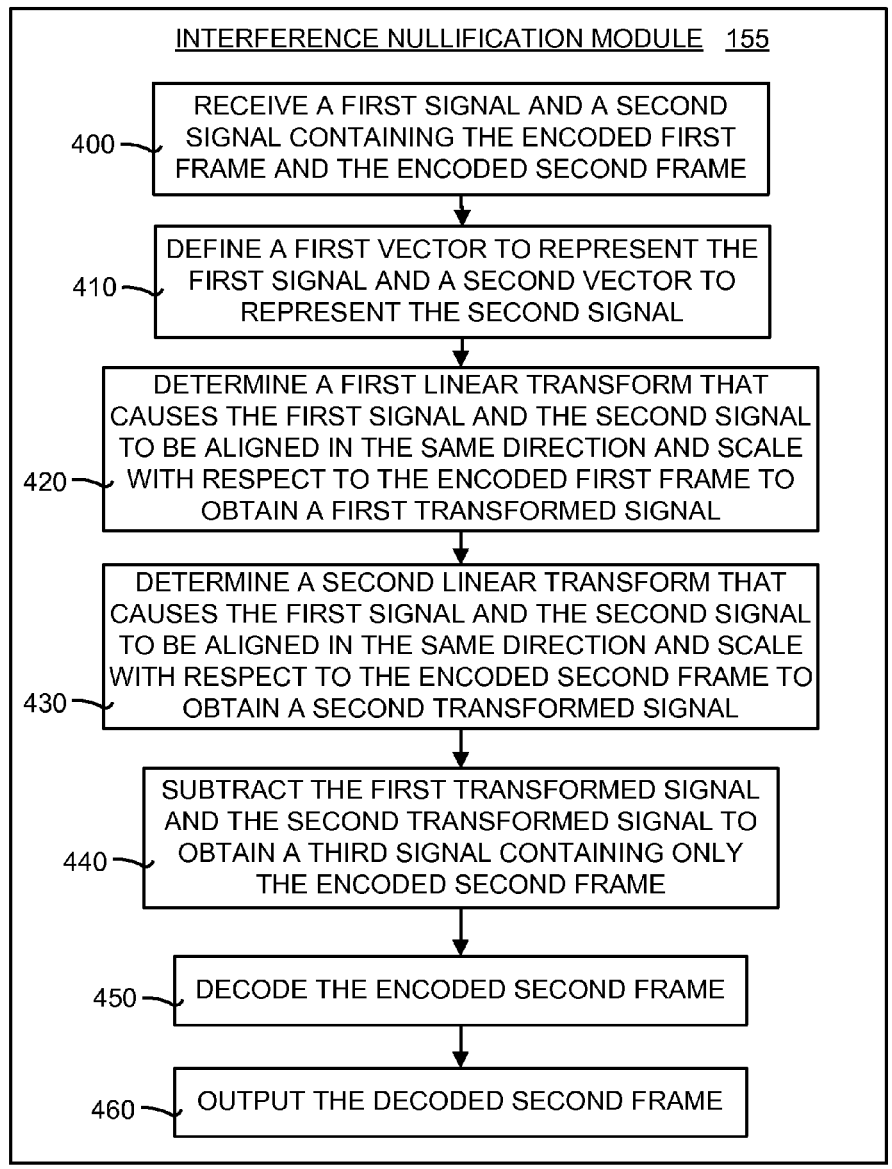
FIG. 4 is a flow diagram illustrating the operational details of embodiments of the interference nullification module shown in FIG. 1.

FIG. 4 is a flow diagram illustrating the operational details of embodiments of the interference nullification module 155 shown in FIG. 1. The operation of embodiments of the module 155 begins by receiving the first signal 125 and the second signal 140 containing the encoded first frame 130 and the encoded second frame 135 (box 400). Next, a first vector is defined to represent the first signal 125 and a second vector is defined to represent the second signal 140 (box 410).

Embodiments of the module 155 then determine a first linear transform that cause the first signal 125 and the second signal 140 to be aligned in the same direction and same scale with respect to the encoded first frame 130 (box 420). This generates a first transformed signal. A second linear transform also is determined that causes the first signal 125 and the second signal 140 to be aligned in the same direction and the same scale with respect to the encoded second frame 135 to obtain a second transformed signal (box 430).

Embodiments of the module 155 then subtract the first transformed signal and the second transformed signal from each other to obtain a third signal that contains only the encoded second frame 135 (box 440). The encoded second frame then is decoded to obtain a decoded second frame (box 450). Embodiments of the module 155 then output the decoded second frame (box 460).

IV.A.1.i. Channel Equalization Module

Figure 5:
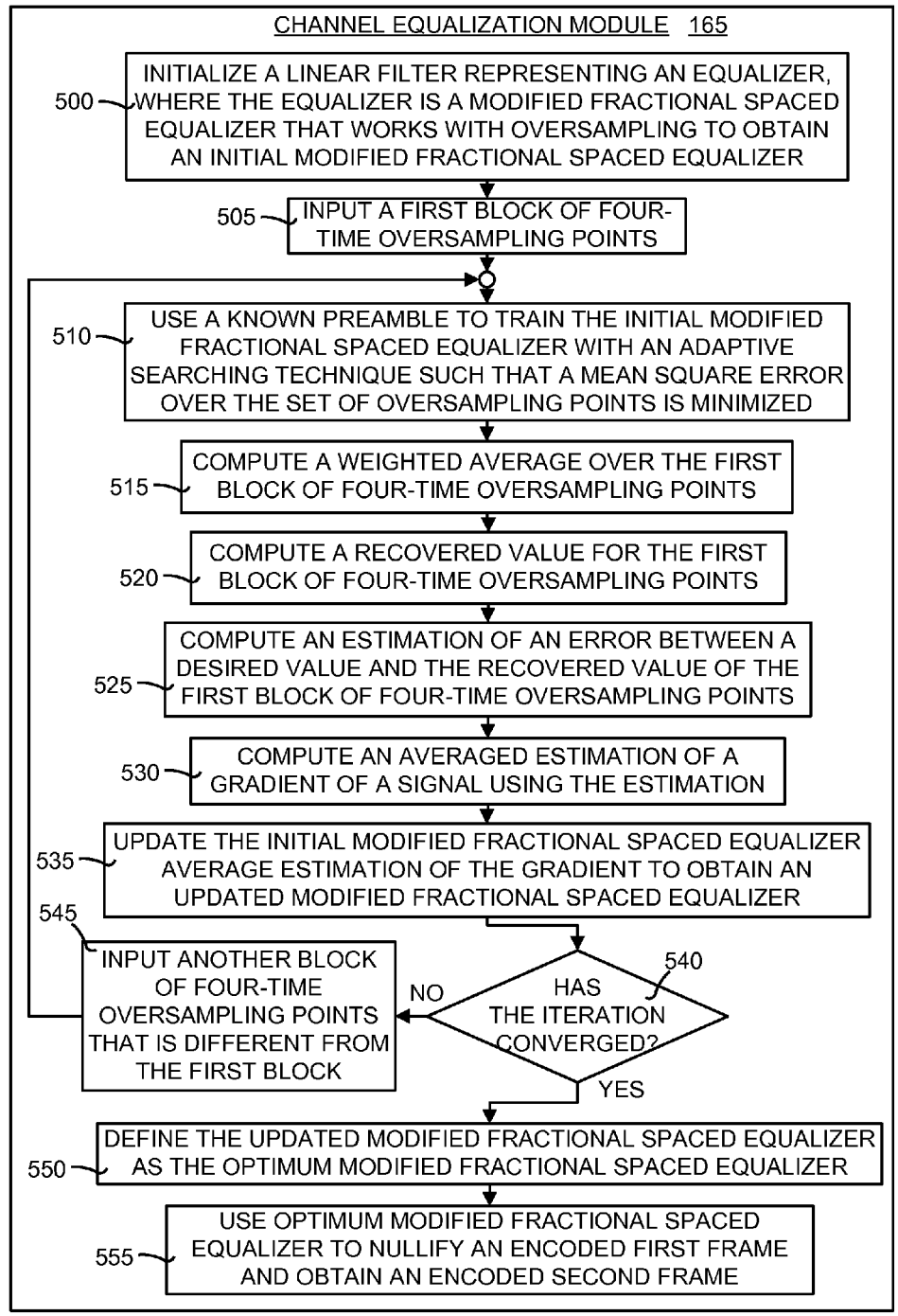
FIG. 5 is a flow diagram illustrating the operational details of embodiments of the channel equalization module shown in FIG. 1.

FIG. 5 is a flow diagram illustrating the operational details of embodiments of the channel equalization module 165 shown in FIG. 1. Embodiments of the module 165 begin by initializing a linear filter representing an equalizer (box 500). In some embodiments the equalizer is a modified fractional spaced equalizer that works with oversampling. This type of equalizer is called an initial modified fractional spaced equalizer. Next, a first block of four-time oversampling points is input (box 505).

A known preamble is used to train the initial modified fractional spaced equalizer by using an adaptive searching technique such that a mean square error over the set of oversampling points is minimized (box 510). Mathematically, an equalizer is a linear filter given by the equation, $$c = \{c_{-L}, \ldots, c_L\},$$

that reverses the impact of a multi-path wireless channel. An optimal equalizer minimizes the difference between the recovered signals and the signals that were transmitted, and is given as, $$c = \operatorname*{argmin}_{c} \|x - c * y\|,$$

where x is the transmitted signal, y is the received signal, $\|\cdot\|$ represents the 2-norm, and "*" is the convolution operation.

To obtain each component value of c, the receiver uses the known preamble to train the equalizer with an adaptive searching algorithm. As noted above, embodiments of the module 165 use a modified fractional spaced equalizer that works with oversampling. In some embodiments of the module 165 a four-time over-sampling is used. Such an equalizer is usually referred to as a fractional spaced equalizer (FSE). However, unlike a conventional FSE that only trains an equalizer to minimize the mean square error at the ideal sampling points, in interference nullifying the equalizer is trained to minimize the mean square error of all oversampling points. In this document this is referred to as a modified fractional spaced equalizer.

Such an approach immediately raises the following issue. Since the transmitter only specifies the value at the sampling point, what are the expected values at the oversampling points? Fortunately, these expected values can be obtained using interpolation from its nearby sample point values. For example, in the IEEE 802.11b standard all transmitted samples are shaped with a root-raised cosine function. Thus, the fractional point values can be interpolated using the power-shaping filter. Mathematically, this can be written as, $$\tilde{x}(nT+\tau) = \sum_{i=-L}^{L} x(nT-iT)R(nT+\tau-iT),$$

where T is the symbol interval, R(·) is the root-raised cosine function, and τ is the fraction of sampling time. When using four-time over-sampling, τ can be $$\frac{T}{4}, \frac{T}{2}, \text{ and } \frac{3T}{4}.$$

Embodiments of the module 165 then compute a weighted average over the first block of four-time oversampling points (box 515). Next, a recovered value is computed for the first block of four-time oversampling points (box 520). At each iteration of embodiments of the module 165, an estimation of error between a desired value and the recovered value of the first block of four-time oversampling points is calculated (box 525).

Embodiments of the module 165 then compute an averaged estimation of a gradient of a signal using the estimation (box 530). An "averaged" estimation of the gradient is calculated as a result. Next, the initial modified fractional spaced equalizer average estimation of the gradient is updated (box 535). This yields an updated modified fractional spaced equalizer. A determination then is made as to whether the iteration has converged (box 540). If not, then embodiments of the module 165 input another block of four-time oversampling points that is different from the first block (box 545).

If the iteration has converged, then embodiments of the module 165 define the updated modified fractional spaced equalizer as the optimum modified fractional spaced equalizer (box 550). This optimum modified fractional spaced equalizer is used to nullify encoded first frame 130 and to obtain the encoded second frame 135 alone (box 555). Results have shown that after equalization multi-path distortion can be effectively mitigated and over 90% of the original signal energy can be nullified.

IV.A.1.ii. Frame Decoding Module

After interference nullifying it is straightforward to decode the encoded second frame ($P_b$) 135. Because the interference of the encoded first frame ($P_a$) 130 has been removed, the preamble of $P_b$ is now clean. This means that the access point 120 can resynchronize to the encoded second frame ($P_b$) 135, estimate the frequency offset and channel parameters, and decode it using the normal decoder. It should be noted that this wireless channel is actually a combined effect of the original wireless channels ($H_{i,j}$, where i, j=1, 2).

Figure 6:
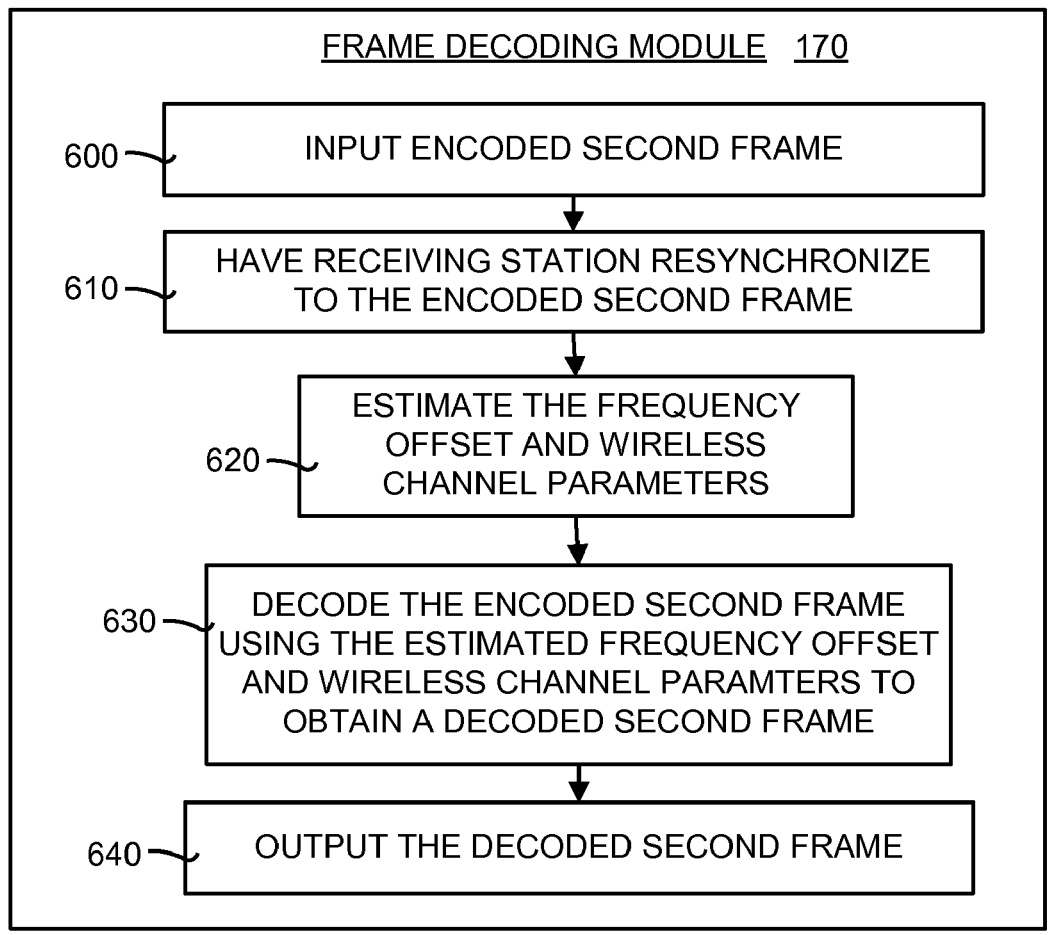
FIG. 6 is a flow diagram illustrating the operational details of embodiments of the frame decoding module shown in FIG. 1.

FIG. 6 is a flow diagram illustrating the operational details of embodiments of the frame decoding module 170 shown in FIG. 1. The operation of embodiments of the module 170 begins by inputting the encoded second frame 135 (box 600). Next, the receiving station (such as the access point 120) resynchronizes to the encoded second frame 135 (box 610). The frequency offset and the wireless channel parameters then are estimated (box 620).

Embodiments of the module 170 then decode the encoded second frame 135 using the estimated frequency offset and the wireless channel parameters (box 630). This yields a decoded second frame. Embodiments of the module 170 then output the decoded second frame (box 640).

IV.A.2. Interference Cancellation Module

After the encoded second frame ($P_b$) 135 is decoded it can be re-encoded and canceled from the original signals. To cancel the encoded second frame 135, the access point 120 regenerates a series of samples, each of which has the exactly same phase shifting caused by the sample timing offset, carrier frequency offset, and the same distortion of the wireless channel. Assuming all this information is known, the generation of symbols of the encoded second frame 135 at receiving antenna i takes the following steps.

Figure 7:
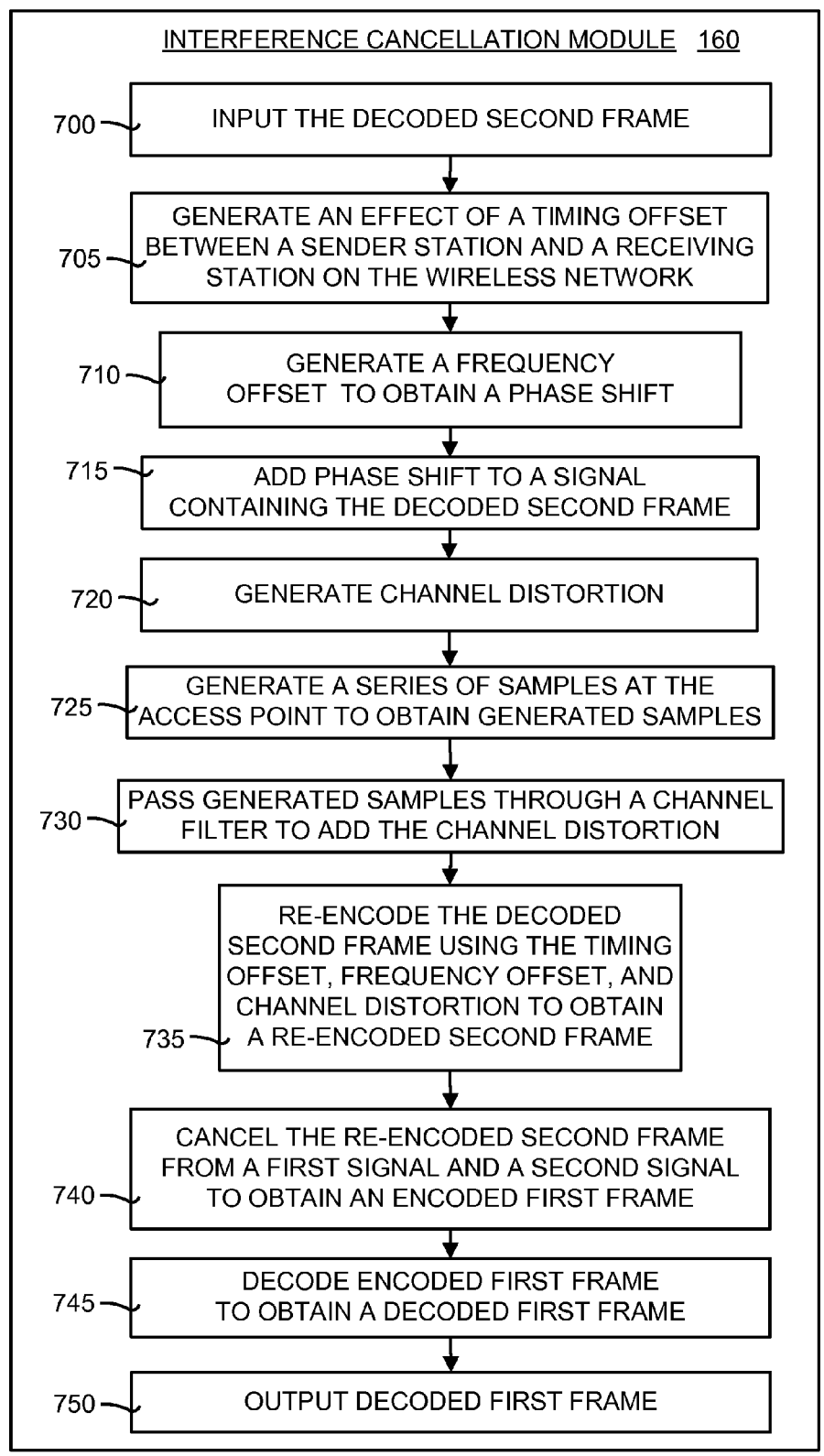
FIG. 7 is a flow diagram illustrating the operational details of embodiments of the interference cancellation module shown in FIG. 1.

FIG. 7 is a flow diagram illustrating the operational details of embodiments of the interference cancellation module 160 shown in FIG. 1. The operation of embodiments of the module 160 begins by inputting the decoded second frame (box 700). Next, an effect of a timing offset between a sender station and a receiving station on the wireless network is generated (box 705). It is desirable to first generate the effect of the timing offset between the sender and receiver. Again, interpolation is used to obtain values at the receiver's sampling points, with $$\tilde{y}_i(nT+\tau) = \sum_{j=-L}^{L} x(nT-jT)R(nT+\tau-jT),$$

where R(·) is the root-raised cosine function and τ is the estimated sampling offset.

Next, embodiments of the module 160 generate a frequency offset to obtain a phase shift (box 710). The phase shift caused by the frequency offset is added to a signal containing the decoded second frame (box 715). Mathematically, this is given by the equation, $$\hat{y}_i[nT+\tau] = \tilde{y}_i(nT+\tau)e^{j2\pi\Delta f(nT+\tau)}.$$

Embodiments of the module 160 then generate channel distortion (box 720) and generate a series of samples at the access point 120 to obtain generated samples (box 725). The generated samples then are passed through a channel filter to add the multi-path distortions (box 730). Mathematically, this is given by, $$y_i[nT+\tau] = h_{i2} * \hat{y}_i[nT+\tau],$$

where $h_{i2}$ represents the channel vector between the $i^{th}$ receiving antenna and the sending antenna of the encoded second frame ($P_b$) 135.

Recall that, when decoding $P_b$, the receiver can already estimate the frequency offset and symbol timing of $P_b$, and the only unknown factor are the wireless channel coefficients. One challenge is that the preamble of $P_b$ overlaps with $P_a$. Thus, when purely relying on the preamble a precise estimation of the channel coefficients cannot be obtained. Fortunately, since $P_b$ has already been decoded then all of $P_b$ can be used as training symbols and thereby can greatly mitigate the impact of the interference from $P_a$.

Channel estimation is similar to finding an equalizer, but now a vector h can be found such that, $$h = \underset{h}{\operatorname{argmin}} \|y - h * x\|,$$

where x is the transmitted signal, y is the received signal, and "*" is the convolution operation. The modified fractional spaced equalizer techniques discussed above can be used to estimate the channel, except that x and y are exchanged.

Embodiments of the module 160 then re-encode the decoded second frame using the timing offset, frequency offset, and the channel distortion to obtain a re-encoded second frame (box 735). The re-encoded second frame is canceled from the first signal 125 and the second signal 140 to obtain the encoded first frame 130 alone (box 740). This encoded first frame 130 is decoded to obtain a decoded first frame (box 745). In other words, after the signal of the encoded second frame ($P_b$) 135 is canceled then the encoded first frame ($P_a$) 130 can be decoded. Because there are two versions of the encoded first frame ($P_a$) 130 from two receiving antennas, then can be decoded in parallel and the encoded first frame ($P_a$) 130 is received if any one of the $P_a$s is decoded successfully. Finally, the decoded first frame is output from embodiments of the module (box 750).

IV.A.3. Frequency Offset and Symbol Timing Tracking

In chain-decoding, with interference nullifying the receiver can get an almost interference-free preamble for each frame in an overlapped transmission. Thus, it is straightforward to estimate the symbol timing and frequency offset to each transmitter. However, due to the limited length of the preamble the estimation may not be accurate enough for the entire transmission. The estimation error will accumulate with the duration of the transmission, and in the worst case, it will cause a decoding error in the latter portion of transmission.

To track these parameters for the entire transmission, chain-coding divides a long transmission into blocks and decode them one-by-one. An arrival of a new frame starts a new block, and a block typically contains whole preambles. After each block is decoded, the decoded symbols are used as training symbols to update the estimations of frequency offset and symbol timing for all transmitters. The size of the block depends on the accuracy of the estimations. It can be larger if the estimation has a high accuracy. In some embodiments of the module 150 a block less than 3 ms is sufficient for accurately tracking these parameters.

IV.A.4. More than Two Frames Overlapped

It is straightforward to extend chain-decoding to N-antenna case. With N frames overlapped the access point first uses the N received signals to nullify the first frame and obtain overlapped signals containing the N−1 frames. Then the interference nullifying process is repeated to nullify proceeding frames. When only the last frame remains, the access point can decoded it and canceled it from the original frames. Then all frames can be decoded recursively. Note that the same procedures also apply to the tracking mode, where instead of the whole frame, each block of the transmission is processed.

IV.B. Carrier Counting Multiple Access Module

As shown in FIG. 1, embodiments of the uncontrolled spatial multiple access system 100 and method include the carrier counting multiple access (CCMA) module 180, 185. Embodiments of the module 180, 185 contain a backwards-compatible media access control (MAC) protocol that enables stations to take advantage of the chain-decoding technique describes above. For purposes of this section, only the first copy of the carrier counting multiple access module 180 will be discussed, as the second copy is essentially the same except for being a different copy.

In addition to chain-decoding overlapped transmissions, spatial multi-access also requires stations to coordinate their transmissions to enable chain-decoding. Stations in embodiments of the system 100 and method use a carrier counting multiple access (CCMA) distributed MAC layer for such coordination. The CCMA protocol is new MAC and is an extended version of the CSMA mechanism used in the IEEE 802.11 standard distributive coordination function (DCF). CCMA is backward compatible with CSMA and can be incrementally deployed in current 802.11 networks.

IV.B.1. General Overview

The basic idea behind the design of CCMA is the observation that when a preamble overlaps with other concurrent transmissions, though difficult to be used for parameter estimations, a receiver can still be able to reliably detect it. The reason is because preambles are fixed and usually transmitted using a robust modulation mode (such as 1 Mbps in the IEEE 802.11b standard).

For example, assumed the transmission of two overlapped frames in the IEEE 802.11b standard with 1 Mbps modulation has been measured. In order to detect the preamble, embodiments of the system 100 and method use the first 20 μs (the length of a sensing slot in the IEEE 802.11b standard) samples of a preamble as a template. The results can be cross-correlated to show two peaks that indicate the start of two frames. This correlation-based mechanism is a reliable technique even in the presence of strong interference.

This observation implies that a station can learn the number of concurrent transmissions by observing the channel and detecting and counting preambles. For example, assume that an access point has N antennas, thereby allowing up to N concurrent transmissions from different stations to the access point. A station with a backlogged frame for the access point will count the number of concurrent transmissions in the channel (say k) by sensing and counting preambles. If k is less than N, then there is a transmission opportunity for the station. This is the general idea of the CCMA technique.

IV.B.2. CCMA MAC Protocol

Figure 8:
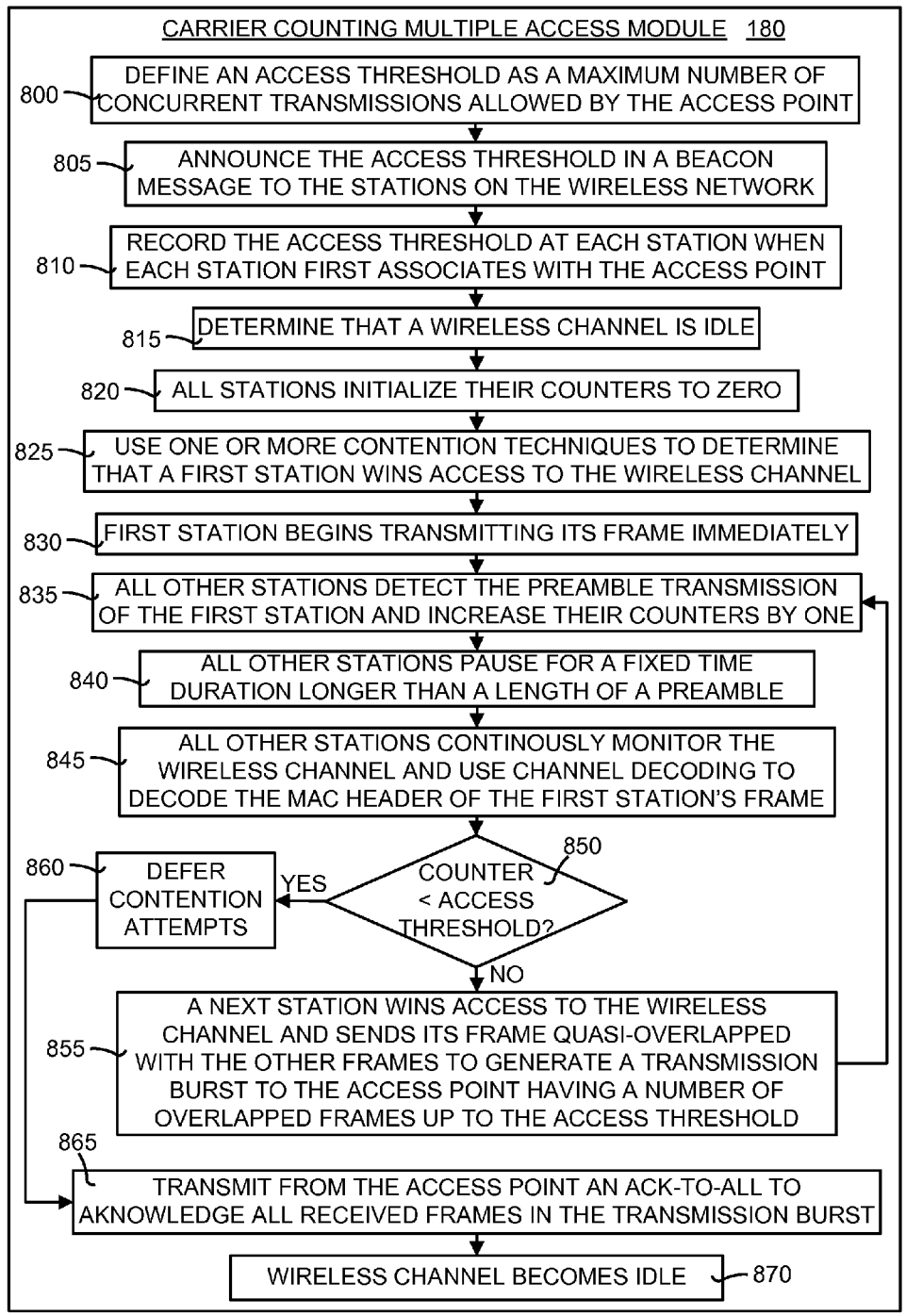
FIG. 8 is a flow diagram illustrating the operational details of embodiments of the carrier counting multiple access module shown in FIG. 1.

In this section it is assumed that all stations 105, 110 and the access point 120 support CCMA. Backward compatibility where some stations or the access point are standard 802.11 devices is discussed below. FIG. 8 is a flow diagram illustrating the operational details of embodiments of the carrier counting multiple access module 180 shown in FIG. 1. The operation of embodiments of the module 180 begins by defining an access threshold, K, as a maximum number of concurrent transmissions allowed by the access point 120 (box 800). The access threshold depends on the number of antennas, N, belonging to the access point 120. Normally, $K \leq N$. The access point 120 in embodiments of the module 180 will announce its access threshold to the stations 105, 110 in the beacon message (box 805). Next, each of the stations 105, 110 records the access threshold when that station first associates with the access point 120 (box 810).

Embodiments of the CCMA technique is a pure contention-based protocol. Each station 105, 110 maintains a counter for concurrent transmissions. Stations 105, 110 first determine that a wireless channel is idle (box 815). When a station senses an idle channel (no transmission), then each station 105, 110 resets its counter to zero (box 820).

A collision over the wireless channel could happen when two stations try to send in the same contention time slot. Collisions may result in decoding failure during chain-decoding, since two preambles overlap together and may cause unreliable parameter estimation. In such cases all transmitted stations may not receive an ACK-to-All message. When a collision is detected, it is crucial for all transmitting stations to backoff to prevent collision collapse in a contention-based protocol. Embodiments of the module 180 use one or more contention techniques to determine that a first station 105 wins access to the idle wireless channel (box 825).

A first contention technique is a similar exponential backoff strategy as in the IEEE 802.11 standard. Using this same backoff procedure and contention window parameters as in the IEEE 802.11 standard to provides backward compatibility. Specifically, when a collision occurs the contention window is doubled. Although this mechanism has proved to be effective in the IEEE 802.11 standard to resolve collisions, it reduces the gain of embodiments of the module 180 since smaller portions of frames are overlapped. In a second contention technique it is possible for all contending stations to pick a random number p such that each station will only contend for the next transmission opportunity with a probability of p. It should be noted that these two contention techniques can be combined to manage the contention in embodiments of the module 180.

When the wireless channel is idle the stations 105, 110 contend for the first transmission opportunity. Once the first station 105 wins the contention it will begins transmitting its frame immediately (box 830). At this time all other stations detect the preamble transmission of the first station 105 and increase their counters by one (box 835). All other stations also pause for a fixed time duration that is longer than a length of a preamble (box 840).

All stations continuously monitor the wireless channel and use channel decoding to decode the MAC header of the frame from the first station 105 (box 845). From this the stations can learn the transmission target. If the target is the access point 120 containing embodiments of the module 180 with an access threshold K larger than one, then additional transmission opportunities remain for other backlogged stations to transmit to the same access point.

A determination then is made as to whether the counter is less than the access threshold (box 850). If not, then stations will contend for the second transmission opportunity with a random backoff. A next station wins access to the wireless channel and sends its frame quasi-overlapped with the other frames over the wireless channel (box 855). This generates a transmission burst to the access point 120, where the transmission burst contains a number of overlapped frames up to the access threshold. By way of example, assume the winning station is the second station 110. Once it wins the contention it starts its transmission and all other stations update their counters. Again, all stations pause for a fixed time duration larger than the length of a preamble. Then, they contend for the third transmission opportunity, if allowed by the access point's 120 threshold K.

If the counter is equal or larger than the access threshold, K, the station defer its contention attempt (box 860) until the channel becomes idle again and the counter is reset to zero. Thus, up to K frames may be overlapped to form a transmission burst. At the end of transmission burst, an ACK-to-All is transmitted by the access point 120 to acknowledge all received frames in the last transmission burst (box 865). Then the wireless channel becomes idle for a time (box 870). After the wireless channel has been idle again for a certain period of time, all stations start to contend for transmission of their next frames.

There are a few points to consider. First, in embodiments of the module 180 a single ACK frame is used to acknowledge all frames in an overlapped transmission. This design is suitable when the major frame losses are caused by collisions. This is because when collision occurs all frames may fail to be decoded. When the major reason of frame losses is channel errors, it is possible to extend the ACK-to-All frame to selective acknowledgement in CCMA. In this case, the ACK frame may contain multiple fields to indicate the senders of successfully received frames to avoid unnecessary retransmissions.

Second, It is possible that a station senses transmission energy on the channel but fails to detect a preamble. For example, it may be a transmission from an IEEE 802.11 device that is not running embodiments of the system 100 and method. Or it may happen when a station returns to the receiving mode after its transmission and therefore misses the preamble of other concurrent transmissions. In either of these two cases, the station loses track of the channel and it is desirable to behave conservatively by deferring its transmission attempts until the channel is idle again.

Third, based on sensing the CCMA technique shares similar hidden terminal issue like CSMA. Although there have been extensive proposals to address the limitations of CSMA in the literature, the hidden terminal problem is still not well-solved. However, impact of hidden terminal may be mitigated with chain decoding. An access point 120 running embodiments of the system 100 and method can announce an access threshold K to be smaller than its actually deployed antennas. Thus, when frames from hidden terminals collide, the access point may still be able to decode them if their preambles do not collide. This is quite likely as hidden terminals access channel in a completely random and asynchronous manner.

IV.B.3. Backward Compatibility

Embodiments of the CCMA technique are compatible with CSMA. There are two situations to consider. First, if the access point is a legacy CSMA station, it will not announce an access threshold to CCMA stations. The CCMA stations will therefore use the default value of one and behave just like CSMA stations.

Second, if the access point use CCMA, both it and associated CCMA stations will need to support and interact with legacy CSMA stations. When an access point 120 is running embodiments of the system 100 and method announce an access threshold K, all CCMA and CSMA stations contend for the first transmission opportunity using the standard mechanism as defined by the 802.11 MAC. If a CCMA station wins, then other CCMA stations may continue to contend for the second transmission opportunity, as described above. All CSMA stations will hold their transmission attempts until the channel is idle again. If a CSMA station wins, then all stations including CCMA nodes and other CSMA nodes will also defer their transmissions so that they do not interfere with the anticipated subsequent ACK frame.

To differentiate a CCMA transmission from a conventional CSMA frame, a reserved bit in the CCMA frame header (in other words, the PLCP header in the IEEE 802.11 standard) can be used. When an access point receives a legacy frame from a CSMA station, it will return a normal ACK message. All stations (including both CCMA and CSMA stations) contend for the transmission opportunity fairly once the channel becomes idle.

The overlapped CCMA transmissions may occupy channel longer as a latter frame overlaps the former frame only after its preamble. However, such difference typically is modest. For example, if K=2 and short preamble is used in the IEEE 802.11b standard, the overlapped transmission is only 10% longer than a normal full size 802.11 frame. With K=5, the overlapped transmission is roughly 50% larger. Thus, CCMA is fair to CSMA and the deployment of CCMA will not cause significant throughput degradation to normal CSMA nodes.

V. Exemplary Operating Environment

Embodiments of the uncontrolled spatial multiple access system 100 and method are designed to operate in a computing environment. The following discussion is intended to provide a brief, general description of a suitable computing environment in which embodiments of the uncontrolled spatial multiple access system 100 and method may be implemented.

Figure 9:
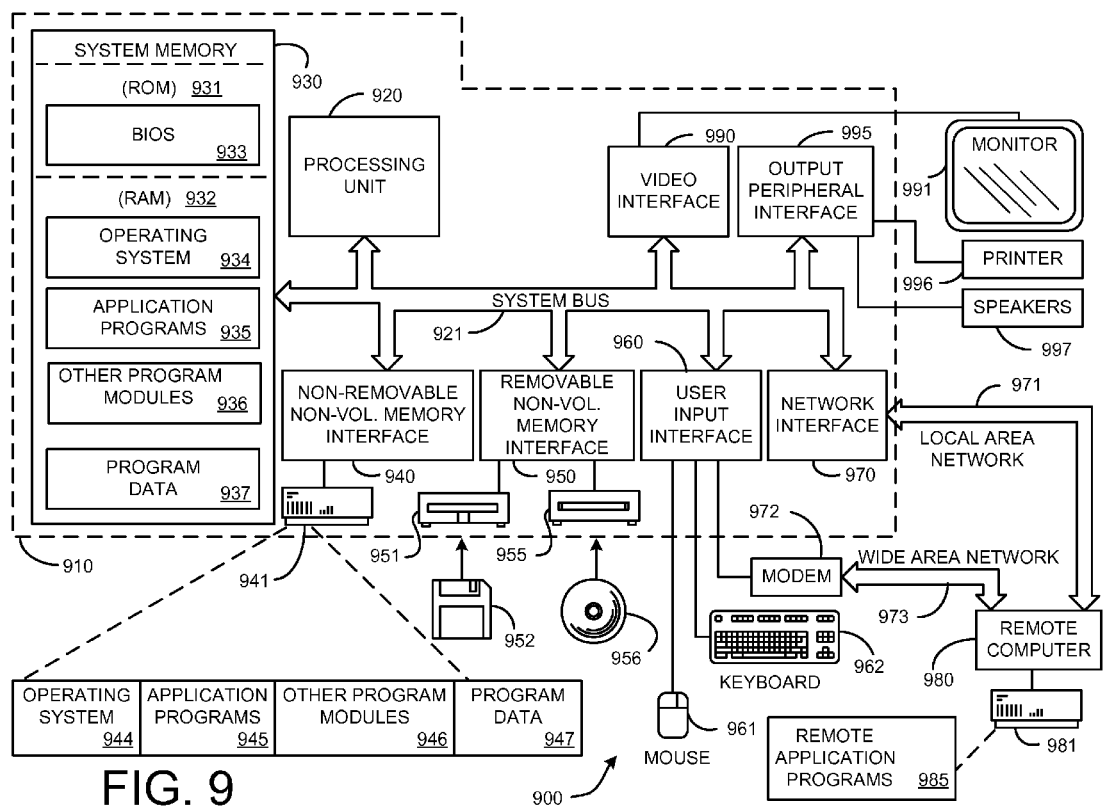
FIG. 9 illustrates an example of a suitable computing system environment in which embodiments of the uncontrolled spatial multiple access system and method shown in FIGS. 1-8 may be implemented.

FIG. 9 illustrates an example of a suitable computing system environment in which embodiments of the uncontrolled spatial multiple access system 100 and method shown in FIGS. 1-8 may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment.

Embodiments of the uncontrolled spatial multiple access system 100 and method are operational with numerous other general purpose or special purpose computing system environments or configurations. Examples of well known computing systems, environments, and/or configurations that may be suitable for use with embodiments of the uncontrolled spatial multiple access system 100 and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the uncontrolled spatial multiple access system 100 and method may be described in the general context of computer-executable instructions, such as program modules, being executed by a computer. Generally, program modules include routines, programs, objects, components, data structures, etc., that perform particular tasks or implement particular abstract data types. Embodiments of the uncontrolled spatial multiple access system 100 and method may also be practiced in distributed computing environments where tasks are performed by remote processing devices that are linked through a communications network. In a distributed computing environment, program modules may be located in both local and remote computer storage media including memory storage devices. With reference to FIG. 9, an exemplary system for embodiments of the uncontrolled spatial multiple access system 100 and method includes a general-purpose computing device in the form of a computer 910.

Components of the computer 910 may include, but are not limited to, a processing unit 920 (such as a central processing unit, CPU), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 910 typically includes a variety of computer readable media. Computer readable media can be any available media that can be accessed by the computer 910 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 910. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within the computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information (or data) into the computer 910 through input devices such as a keyboard 962, pointing device 961, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 920 through a user input interface 960 that is coupled to the system bus 921, but may be connected by other interface and bus structures, such as, for example, a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for transmitting and decoding multiple overlapped frames in a wireless network, comprising:
    transmitting an encoded first frame from a first station on the wireless network;
    transmitting an encoded second frame from a second station in the wireless network immediately after an end of a preamble of the encoded first frame has been transmitted such that the encoded first frame and the encoded second frame are quasi-overlapped;
    receiving the encoded first frame and the encoded second frame at an access point on the wireless network; and
    using chain decoding to decode the overlapping encoded first frame and encoded second frame to obtain a decoded first frame and a decoded second frame.

2. The method of claim 1, further comprising:
    receiving at the access point a first signal and a second signal both containing the overlapped encoded first frame and the encoded second frame;
    using interference nullification to nullify the encoded first frame from the first signal and the second signal and obtain the encoded second frame; and
    decoding the encoded second frame to obtain the decoded second frame.

3. The method of claim 2, further comprising:
    defining a first vector to represent the first signal and a second vector to represent the second signal; and
    determining a first linear transform that causes the first signal and the second signal to be aligned in the same direction and scale with respect to the encoded first frame to obtain a first transformed signal.

4. The method of claim 3, further comprising determining a second linear transform that causes the first signal and the second signal to be aligned in the same direction and scale with respect to the encoded second frame to obtain a second transformed signal.

5. The method of claim 4, further comprising subtracting the first transformed signal and the second transformed signal to obtain a third signal containing only the encoded second frame.

6. The method of claim 5, further comprising resynchronizing the access point to the encoded second frame.

7. The method of claim 6, further comprising:
    estimating a frequency offset and wireless channel parameters; and
    decoding the encoded second frame using the frequency offset and the wireless channel parameters to obtain the decoded second frame.

8. The method of claim 2, further comprising:
    re-encoding the decoded second frame to obtain a re-encoded second frame;
    using interference cancellation and the re-encoded second frame to cancel the encoded second frame from the first signal and the second signal to obtain the first encoded frame; and
    decoding the encoded first frame to obtain the decoded first frame.

9. The method of claim 8, further comprising:
    generating an effect of a timing offset between the first station and the access point;
    generating a frequency offset to obtain a phase shift; and
    adding the phase shift to the re-encoded second frame.

10. The method of claim 9, further comprising:
    generating channel distortion;
    generating a series of samples at the access point to obtain generated samples;
    passing the generated samples through a channel filter to add the channels distortion; and
    re-encoding the decoded second frame using the timing offset, the frequency offset, and the channel distortion to obtain the re-encoded second frame.

11. The method of claim 10, further comprising:
    canceling the re-encoded second frame from the first signal and the second signal to obtain the encoded first frame; and
    decoding the encoded first frame to obtain the decoded first frame.

12. The method of claim 1, further comprising using a carrier counting multiple access technique at the first station and the second station to coordinate the quasi-overlapped transmission and facilitate the chain decoding at the access point.

13. The method of claim 12, further comprising implementing the carrier counting multiple access technique in the media access control layer of the first station and the second station.

14. A method for nullifying an encoded first frame transmitted wirelessly in a first signal containing a quasi-overlapping encoded first frame and encoded second frame, comprising:

initializing a linear filter representing an equalizer to obtain an initial modified fractional spaced equalizer, where the equalizer is a modified fractional spaced equalizer that works with oversampling;

updating the initial modified fractional spaced equalizer based on an averaged estimation of a gradient of the first signal to obtain an updated modified fractional spaced equalizer;

determining whether an iteration has converged;

if the iteration has converged, then defining the updated modified fractional spaced equalizer as an optimum modified fractional spaced equalizer; and using the optimum modified fractional spaced equalizer to nullify the encoded first frame and obtain the encoded second frame without interference from the encoded first frame.

15. The method of claim 14, further comprising:

inputting a first block of four-time oversampling points;

using a known preamble to train the initial modified fractional spaced equalizer with an adaptive searching technique such that a mean square error over the set of oversampling points is minimized;

computing a weighted average over the first block of four-time oversampling points;

computing a recovered value for the first block of four-time oversampling points; and computing an error estimation of an error between a desired value and the recovered value of the first block of four-time oversampling points.

16. The method of claim 15, further comprising:

computing the averaged estimation of a gradient of the first signal using the error estimation;

if the iteration has not converged, then inputting another block of four-time oversampling points that is different from the first block of four-time oversampling points; and repeating the iteration until the iteration converges on the optimum modified fractional spaced equalizer.

17. A method for facilitating quasi-overlapping transmissions of an encoded first encoded frame and an encoded second frame in a wireless network, comprising:

determining that a wireless channel in the wireless network is idle;

having each station on the wireless network initialize its counter to zero;

using at least one contention technique to determine that a first station wins access to the idle wireless channel;

having the first station begin transmitting the encoded first frame immediately after winning access to the wireless channel;

having each station detect the transmission of a preamble of the encoded first frame and increasing each station's counter by one when this detection occurs;

causing stations other than the first station to pause for a fixed time duration that is longer than a length of the preamble;

continuously monitoring the wireless channel with the stations other than the first station;

using channel decoding to decode the media access control header of the encoded first frame; and having a second station transmit the encoded second frame immediately after transmission of the preamble of the encoded first frame such that the encoded first frame and the encoded second frame are quasi-overlapped.

18. The method of claim 17, further comprising:

defining an access threshold as a maximum number of concurrent transmissions allowed by an access point in the wireless network;

announcing the access threshold in a beacon message to the stations on the wireless network; and recording the access threshold at each station when each station first associates with the access point.

19. The method of claim 18, further comprising:

determining whether the counter is less than the access threshold; and if the counter is less than the access threshold, then having the second station win access to the wireless channel and transmit the encoded second frame quasi-overlapped with the encoded first frame to generate a transmission burst to the access point.

20. The method of claim 19, further comprising:

if the counter is greater than or equal to the access threshold, then waiting for an ACK-to-All signal to acknowledge each received frame in the transmission burst from the access point;

detecting that the wireless channel has become idle; and resetting counters to zero.

* * * * *